(12) United States Patent
Sekine

(10) Patent No.: US 10,606,538 B2
(45) Date of Patent: Mar. 31, 2020

(54) DISPLAY INFORMATION MANAGEMENT SYSTEM

(71) Applicant: INTERACTIVE SOLUTIONS CORP., Tokyo (JP)

(72) Inventor: Kiyoshi Sekine, Tokyo (JP)

(73) Assignee: INTERACTIVE SOLUTIONS CORP., Tokyo (JP)

( * ) Notice: Subject to any disclaimer, the term of this patent is extended or adjusted under 35 U.S.C. 154(b) by 0 days.

(21) Appl. No.: 16/156,540

(22) Filed: Oct. 10, 2018

(65) Prior Publication Data

US 2019/0042172 A1    Feb. 7, 2019

Related U.S. Application Data

(63) Continuation of application No. 15/319,164, filed as application No. PCT/JP2015/065416 on May 28, 2015, now Pat. No. 10,120,632.

(30) Foreign Application Priority Data

Jun. 16, 2014   (JP) .................. 2014-123557

(51) Int. Cl.
*G06F 17/00*   (2019.01)
*G06F 3/14*    (2006.01)
(Continued)

(52) U.S. Cl.
CPC .............. *G06F 3/14* (2013.01); *G06F 16/93* (2019.01); *G06F 17/2205* (2013.01); *G06F 17/2288* (2013.01); *G06Q 10/00* (2013.01)

(58) Field of Classification Search
CPC ............ G06F 16/9577; G06F 16/2365; G06F 16/254; G06F 16/93; G06F 17/2288; G06F 3/14; G06F 17/2205
See application file for complete search history.

(56) References Cited

U.S. PATENT DOCUMENTS 4,539,653 A    9/1985 Bartlett
5,410,688 A    4/1995 Williams
(Continued)

FOREIGN PATENT DOCUMENTS

JP    9-282204 A    10/1997
JP    H09-282204 A   10/1997
(Continued)

OTHER PUBLICATIONS

International Search Report of PCT/JP2015/065416 (Disclosed with the IDS in the parent application dated Dec. 15, 2016).

*Primary Examiner* — Laurie A Ries
(74) *Attorney, Agent, or Firm* — Muncy, Geissler, Olds & Lowe, P.C.

(57) ABSTRACT

To provide a display information management system that greatly reduces the load of a management device when providing presentation screen information and the like created at each terminal, and the like to other terminals.

A display information management system (1) includes a terminal device (50) including specific basic software (OS), specific information displaying software for creating a presentation screen operable with the specific basic software, and a database; and a management device (10), where the terminal can associate information of the database and each screen of the presentation, and create the presentation information created with the specific information displaying software with heterogeneous presentation information; and transmit the presentation information and the heterogeneous presentation information to the management device.

2 Claims, 13 Drawing Sheets

(51) Int. Cl.
*G06F 16/93* (2019.01)
*G06Q 10/00* (2012.01)
*G06F 17/22* (2006.01)

(56) References Cited

U.S. PATENT DOCUMENTS

| | | | |
|---|---|---|---|
| 5,440,744 A * | 8/1995 | Jacobson | G06F 9/548 |
| | | | 709/203 |
| 5,596,744 A * | 1/1997 | Dao | G06F 16/256 |
| 5,727,220 A | 3/1998 | Hohensee | |
| 6,076,103 A | 6/2000 | Sakai | |
| 6,128,012 A | 10/2000 | Seidensticker, Jr. | |
| 6,175,363 B1 | 1/2001 | Williams | |
| 6,212,530 B1 | 4/2001 | Kadlec | |
| 6,593,943 B1 | 7/2003 | MacPhail | |
| 6,839,714 B2 * | 1/2005 | Wheeler | G06F 16/25 |
| 6,924,797 B1 | 8/2005 | MacPhail | |
| 7,013,285 B1 | 3/2006 | Rebane | |
| 7,039,861 B2 * | 5/2006 | Yagi | G06F 17/212 |
| | | | 715/251 |
| 7,233,915 B2 | 6/2007 | Metcalfe | |
| 7,331,018 B2 * | 2/2008 | Lee | G06F 16/9577 |
| | | | 715/747 |
| 8,266,119 B2 | 9/2012 | Murata | |
| 8,510,732 B2 | 8/2013 | Chevrette | |
| 2002/0035574 A1 * | 3/2002 | Dumas | G06F 16/254 |
| 2002/0077987 A1 | 6/2002 | Hasegawa | |
| 2002/0103597 A1 | 8/2002 | Takayama | |
| 2004/0054675 A1 * | 3/2004 | Li | G06F 16/252 |
| 2004/0253991 A1 | 12/2004 | Azuma | |
| 2005/0108271 A1 * | 5/2005 | Hurmiz | G06F 16/20 |
| 2007/0156519 A1 * | 7/2007 | Agassi | G06Q 30/0255 |
| | | | 705/14.53 |
| 2008/0271061 A1 * | 10/2008 | Branson | G06F 9/541 |
| | | | 719/328 |
| 2010/0121866 A1 | 5/2010 | Bell | |
| 2012/0083260 A1 | 4/2012 | Arriola | |
| 2012/0150970 A1 | 6/2012 | Peterson | |
| 2013/0009967 A1 | 1/2013 | Nanaumi | |
| 2014/0013232 A1 | 1/2014 | Nakamura | |
| 2014/0099366 A1 | 4/2014 | Kimura | |
| 2014/0181085 A1 | 6/2014 | Gokhale | |
| 2015/0142860 A1 * | 5/2015 | George | G06F 16/22 |
| | | | 707/812 |

FOREIGN PATENT DOCUMENTS

| | | |
|---|---|---|
| JP | 2001-344248 A | 12/2001 |
| JP | 2001344248 A | 12/2001 |
| JP | 2005-275824 A | 10/2005 |
| JP | 2009-169914 A | 7/2009 |
| JP | 2009169914 A | 7/2009 |
| JP | 2013-089016 A | 5/2013 |
| JP | 2013089016 A | 5/2013 |

* cited by examiner

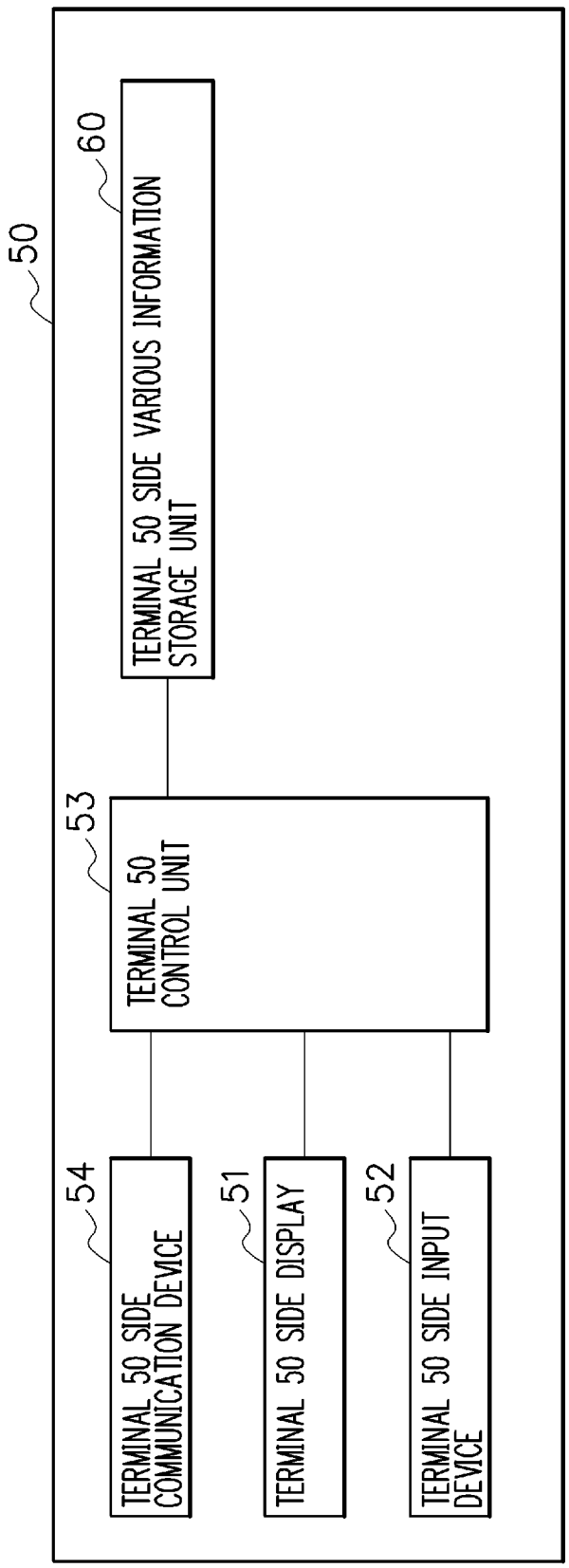

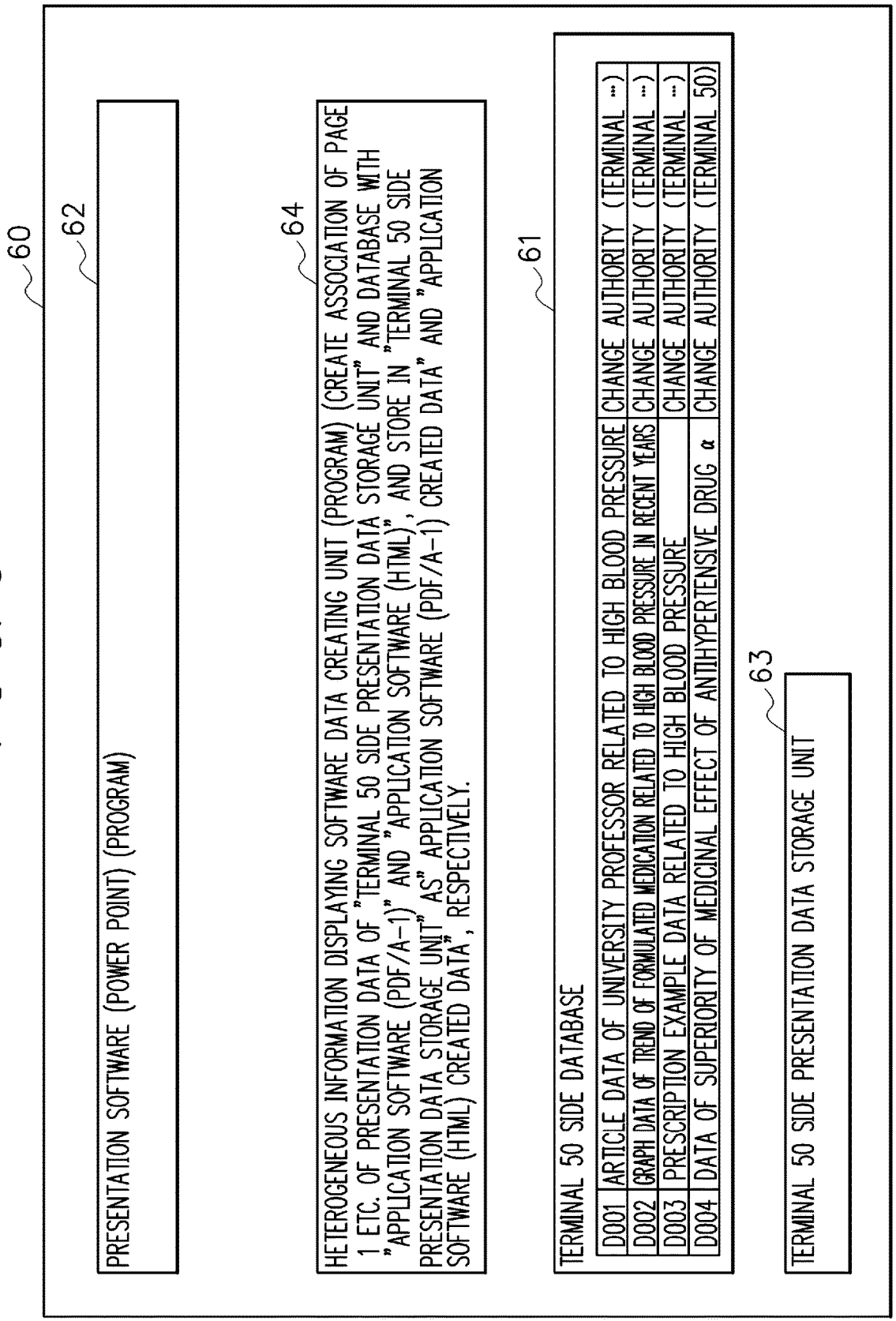

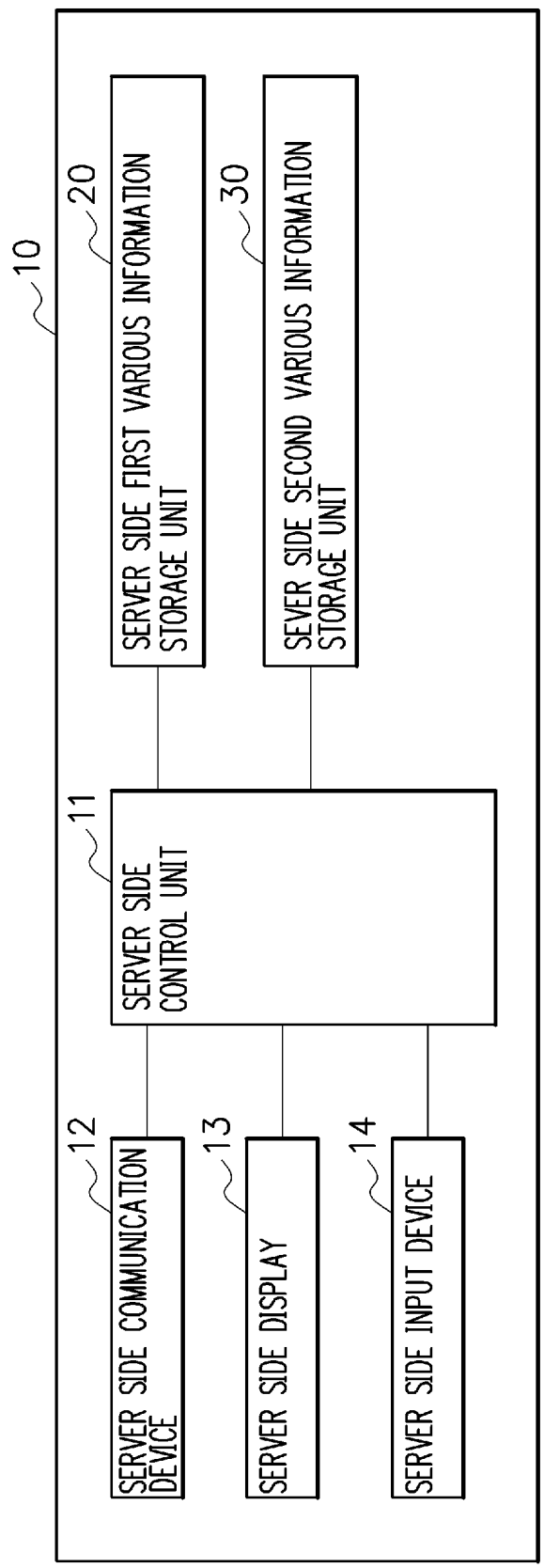

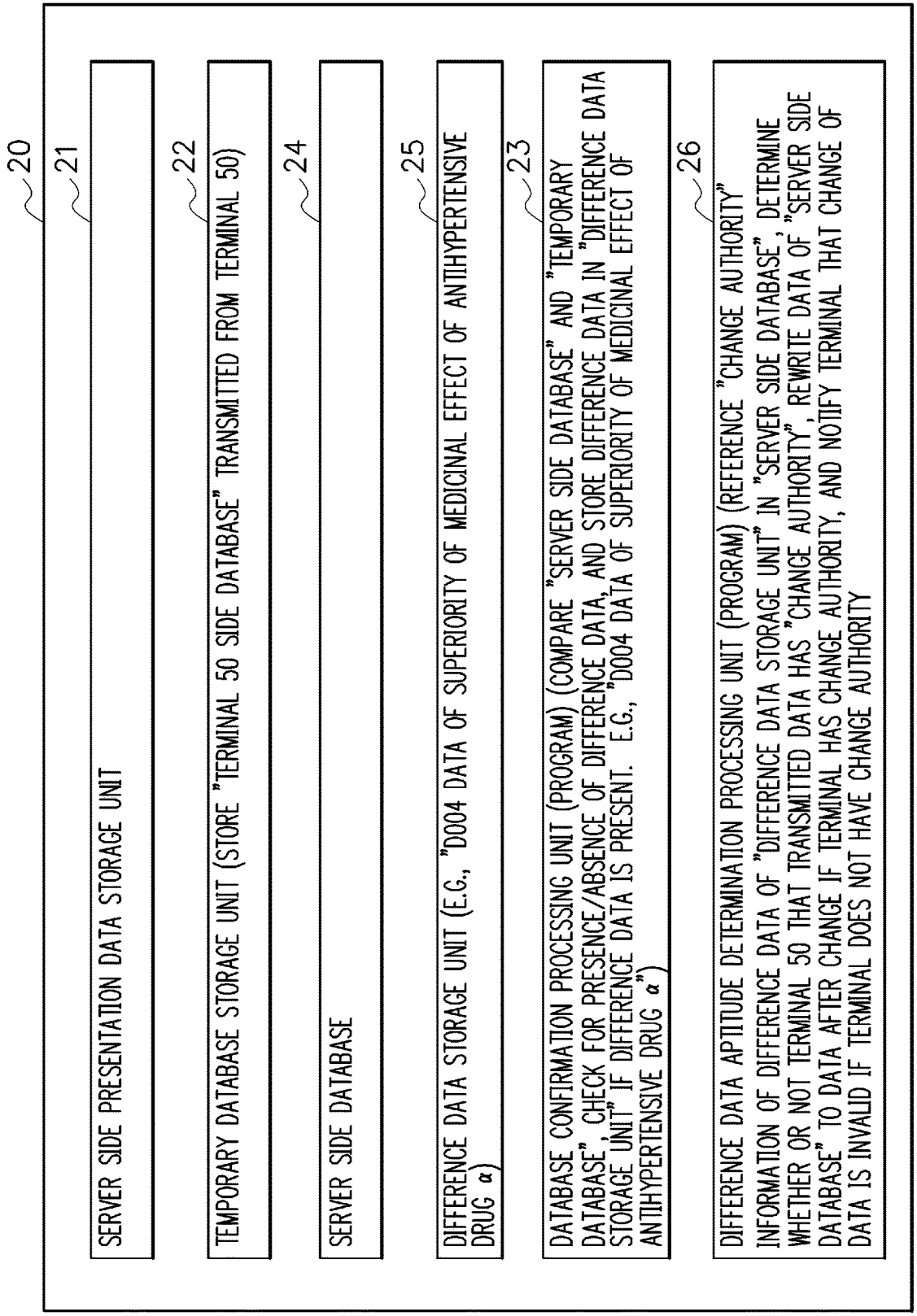

F I G. 6

~30

31 — DATABASE CHANGE NOTIFICATION PROCESSING UNIT (PROGRAM) (WHEN CHANGE IS MADE TO "SERVER SIDE DATABASE", TRANSMIT DATA AFTER CHANGE TO EACH TERMINAL 90 ETC.)

32 — BROWSING REQUEST DETERMINATION PROCESSING UNIT (PROGRAM) (WHEN BROWSING REQUEST OF "PRESENTATION DATA" IS MADE FROM TERMINAL, MANAGEMENT SERVER TRANSMITS "LIST OF NAMES" AND "LIST OF IDENTIFICATION NUMBERS" OF "PRESENTATION DATA" OF "SERVER SIDE PRESENTATION DATA STORAGE UNIT" TO TERMINAL)

33 — TERMINAL OS INFORMATION PROCESSING UNIT (PROGRAM) (WHEN TERMINAL 90 SELECTS AND DESIRES TO DOWNLOAD E.G., "NAME: ANTIHYPERTENSIVE DRUG α", MANAGEMENT SERVER REQUESTS TERMINAL 90 FOR "OS INFORMATION" OF TERMINAL, AND STORES OS INFORMATION OF TERMINAL IN "TERMINAL OS INFORMATION STORAGE UNIT")

34 — TERMINAL OS INFORMATION STORAGE UNIT

35 — DOWNLOAD REQUEST RESPONSE PROCESSING UNIT (PROGRAM) (REFERENCE "TERMINAL OS INFORMATION STORAGE UNIT" AND "OS SUPPORTING OPERABLE INFORMATION DISPLAYING SOFTWARE INFORMATION STORAGE UNIT", SELECT "PRESENTATION APPLICATION" OR "APPLICATION SOFTWARE" OPERABLE ON OS OF TERMINAL, SELECT, FOR EXAMPLE, DATA OF "APPLICATION SOFTWARE (PDF/A-1)" OF PRESENTATION DATA STORED IN "SERVER SIDE PRESENTATION DATA STORAGE UNIT", AND TRANSMIT DATA TO TERMINAL 90)

36 — OS SUPPORTING OPERABLE INFORMATION DISPLAYING SOFTWARE INFORMATION STORAGE UNIT (STORE INFORMATION OF "PRESENTATION APPLICATION (POWER POINT)", "APPLICATION SOFTWARE (PDF/A-1)", "APPLICATION SOFTWARE (HTML)" OPERABLE WITH RESPECT TO OS)

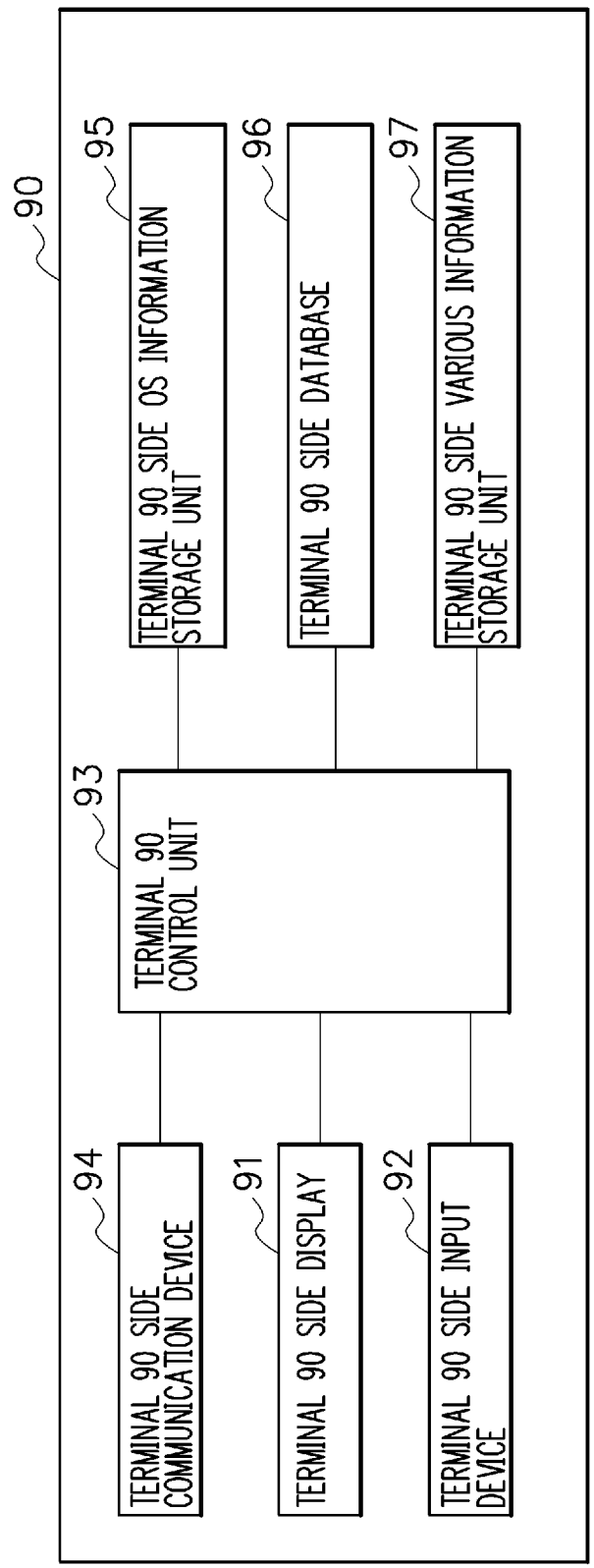

ST7 — SET SUCH THAT WHEN "SLIDE PAGE 3" IS DISPLAYED ON TOUCH PANEL TYPE DISPLAY, "PRESCRIPTION EXAMPLE OF HIGH BLOOD PRESSURE" IS INPUT, SLIDE PAGE 3 AND "D003 PRESCRIPTION EXAMPLE DATA RELATED TO HIGH BLOOD PRESSURE" OF "TERMINAL 50 SIDE DATABASE" ARE ASSOCIATED, AND SIGNAL SUCH AS CLICK IS INPUT IN SLIDE PAGE 3, D003 DATA IS DISPLAYED ON TOUCH PANEL TYPE DISPLAY, AND STORE DATA IN "TERMINAL 50 SIDE PRESENTATION DATA STORAGE UNIT".

ST8 — OPERATE HETEROGENEOUS INFORMATION DISPLAYING SOFTWARE DATA CREATING UNIT (PROGRAM), AND CREATE ASSOCIATION OF PAGE 3 OF PRESENTATION OF "TERMINAL 50 SIDE PRESENTATION DATA STORAGE UNIT" AND DATABASE WITH APPLICATION SOFTWARE (PDF/A-1) AND APPLICATION SOFTWARE (HTML), AND STORE "TERMINAL 50 SIDE PRESENTATION DATA STORAGE UNIT" AS "APPLICATION SOFTWARE (PDF/A-1) CREATED DATA" AND "APPLICATION SOFTWARE (HTML) CREATED DATA", RESPECTIVELY.

ST9 — SET SUCH THAT WHEN "SLIDE PAGE 4" IS DISPLAYED ON TOUCH PANEL TYPE DISPLAY 51, "SUPERIORITY OF MEDICINAL EFFECT OF ANTIHYPERTENSIVE DRUG α" IS INPUT, SLIDE PAGE 4 AND "D004 DATA OF SUPERIORITY OF MEDICINAL EFFECT OF ANTIHYPERTENSIVE DRUG α" OF "TERMINAL 50 SIDE DATABASE" ARE ASSOCIATED, AND SIGNAL SUCH AS CLICK IS INPUT IN SLIDE PAGE 4, D004 DATA IS DISPLAYED ON TOUCH PANEL TYPE DISPLAY, AND STORE DATA IN "TERMINAL 50 SIDE PRESENTATION DATA STORAGE UNIT

ST10 — OPERATE HETEROGENEOUS INFORMATION DISPLAYING SOFTWARE DATA CREATING UNIT (PROGRAM), AND CREATE ASSOCIATION OF SLIDE PAGE 4 OF PRESENTATION OF "TERMINAL 50 SIDE PRESENTATION DATA STORAGE UNIT" AND DATABASE WITH APPLICATION SOFTWARE (PDF/A-1) AND APPLICATION SOFTWARE (HTML), AND STORE IN "TERMINAL 50 SIDE PRESENTATION DATA STORAGE UNIT" AS "APPLICATION SOFTWARE (PDF/A-1) CREATED DATA" AND "APPLICATION SOFTWARE (HTML) CREATED DATA", RESPECTIVELY.

ST11 — TRANSMIT DATA OF "TERMINAL 50 SIDE PRESENTATION DATA STORAGE UNIT" AND "TERMINAL 50 SIDE DATABASE" FROM TERMINAL 50 TO MANAGEMENT SERVER

ST12 — STORE "DATA OF TERMINAL 50 SIDE PRESENTATION DATA STORAGE UNIT" AND DATA OF "TERMINAL 50 SIDE DATABASE" TO "SERVER SIDE PRESENTATION DATA STORAGE UNIT" AND "TEMPORARY DATABASE STORAGE UNIT" BY MANAGEMENT SERVER (B)

F I G. 13

TERMINAL 50 SIDE PRESENTATION DATA 63a

| NAME AND IDENTIFICATION NUMBER OF PRESENTATION | NAME: "ANTIHYPERTENSIVE DRUG α" IDENTIFICATION NUMBER "12345" | | |
|---|---|---|---|
| | SLIDE PAGE | SLIDE CONTENT | ASSOCIATED DATA |
| CREATE WITH PRESENTATION APPLICATION (POWER POINT) | SLIDE PAGE 1 | BASIC INFORMATION OF HIGH BLOOD PRESSURE | D001 |
| | SLIDE PAGE 2 | TREND OF FORMULATED MEDICATION OF HIGH BLOOD PRESSURE | D002 |
| | SLIDE PAGE 3 | PRESCRIPTION EXAMPLE OF HIGH BLOOD PRESSURE | D003 |
| | SLIDE PAGE 4 | SUPERIORITY OF MEDICINAL EFFECT OF ANTIHYPERTENSIVE DRUG α | D004 |
| CREATE WITH APPLICATION SOFTWARE (PDF/A-1) | SLIDE PAGE | SLIDE CONTENT | ASSOCIATED DATA |
| | SLIDE PAGE 1 | BASIC INFORMATION OF HIGH BLOOD PRESSURE | D001 |
| | SLIDE PAGE 2 | TREND OF FORMULATED MEDICATION OF HIGH BLOOD PRESSURE | D002 |
| | SLIDE PAGE 3 | PRESCRIPTION EXAMPLE OF HIGH BLOOD PRESSURE | D003 |
| | SLIDE PAGE 4 | SUPERIORITY OF MEDICINAL EFFECT OF ANTIHYPERTENSIVE DRUG α | D004 |
| CREATE WITH APPLICATION SOFTWARE (HTML) | SLIDE PAGE | SLIDE CONTENT | ASSOCIATED DATA |
| | SLIDE PAGE 1 | BASIC INFORMATION OF HIGH BLOOD PRESSURE | D001 |
| | SLIDE PAGE 2 | TREND OF FORMULATED MEDICATION OF HIGH BLOOD PRESSURE | D002 |
| | SLIDE PAGE 3 | PRESCRIPTION EXAMPLE OF HIGH BLOOD PRESSURE | D003 |
| | SLIDE PAGE 4 | SUPERIORITY OF MEDICINAL EFFECT OF ANTIHYPERTENSIVE DRUG α | D004 |

DISPLAY INFORMATION MANAGEMENT SYSTEM

CROSS REFERENCE TO RELATED APPLICATIONS

This application is a Continuation of U.S. application Ser. No. 15/319,164 filed on Dec. 15, 2016, which is a national stage of International Application No. PCT/JP2015/065416 filed on May 28, 2015, which claims priority under 35 USC 119 to Japanese Patent Application No. 2014-123557 filed on Jun. 16, 2014, the entire contents of which are incorporated herein by reference.

TECHNICAL FIELD

The present invention relates to, for example, a display information management system of display information such as presentation information used at a terminal, and the like by sales representative, and the like.

BACKGROUND ART

A portable terminal device that assists business activities of the sales representative has been conventionally proposed (e.g., patent document 1).

Some portable terminal devices are configured such that the sales representative with the portable terminal can create a presentation screen for his/her customer, and the like, and display the screen on a display of the portable terminal to carry out the business activity.

Some portable terminals having such configuration hold various types of information that can be cited on the presentation screen as a database.

Furthermore, there is also a portable terminal on which a presentation creating software (e.g., Power Point (registered trademark)) for creating a unique presentation screen is operable.

The unique presentation screen created with a specific portable terminal and the information in the database associated therewith are transmitted to a management sever, and the like, and then transmitted from the management server to other portable terminals to allow use by other sales representatives.

Actually, however, the OS (Operation System, basic software running an abstraction of hardware of a terminal to operate the software such as application, etc.) of another portable terminal that receives the unique presentation screen and the information in the database associated therewith from the management server is not, in most cases, the same as the OS of the portable terminal that created the presentation screen, and the like.

In the portable terminal having a different OS, the relevant presentation screen, and the like cannot be displayed on the display, and hence a configuration in which the management server transmits the data such as the presentation screen created with one portable terminal to another portable terminal after converting the data to an application software (e.g., PDF ("Portable Document Format")/A-1, and the like that can be displayed on the another portable terminals is adopted.

CITATION LIST

Patent Document

Patent Document 1: Japanese Unexamined Patent Publication No. 2005-275824 (FIG. 1, etc.)

SUMMARY OF THE INVENTION

Problems to be Solved by the Invention

However, even if the application is converted from the Power Point to the PDF, for example, the relationship of the presentation screen and the associated data of the database may break, and the association may become difficult to appropriately reproduce.

The management server thus needed to convert the data of the unique presentation screen transmitted from each portable terminal, and also re-associate the data of the database with the presentation screen so as to be reproducible with the application after the conversion. This increases the number of portable terminals and imposes a great burden.

The present invention aims to provide a display information management system capable of greatly reducing the load of a management device such as a management server when providing presentation screen information created at each terminal, and the like and information of a database associated therewith to other terminals.

Means for Solving the Problems

The above-described problem is overcome by a display information management system according to the present invention. The display information management system includes a terminal device including specific basic software of basic software, or the Operation System for running an operation including an abstraction of hardware of a computer to operate an application software on the computer, specific information displaying software, or specific information displaying software for creating a presentation screen operable with the specific basic software, and a database that stores various types of information used with the creation of the presentation screen; and a management device communicably connected to the terminal; wherein at least one terminal associates, when the specific information displaying software creates a presentation, information of the database and each screen of the presentation, and creates the presentation information, created with the specific information displaying software and created in association with the database, with heterogeneous presentation information, or information created with another specific information displaying software, and transmits the presentation information and the heterogeneous presentation information to the management device.

According to the configuration described above, the presentation information (presentation information created with the Power Point) created with the specific information displaying software such as, for example, the Power Point (registered trademark) and created in association with the database can be created with information created with another specific information displaying software such as PDF/A-1.

Thus, both the Power Point presentation information created with the Power Point and the PDF/A-1 presentation information created and processed with the PDF/A-1 can be stored.

Furthermore, the management device can acquire the Power Point presentation information and the PDF/A-1 presentation information from the terminal device.

Therefore, when providing the presentation information acquired in the above manner to another terminal device, the management server can select and provide the presentation information (Power Point presentation information and/or PDF/A-1 presentation information) operable on the relevant another terminal device, thus greatly reducing the burden of the management device.

Furthermore, the defects, and the like in the association of data involved in the data conversion can be prevented from occurring.

The management device preferably selects and provides the presentation information and/or the heterogeneous presentation information operable with the basic software based on the basic software information of the terminal device, or a destination to provide the presentation information.

According to the configuration described above, the management device selects and provides the presentation information and/or the heterogeneous presentation information operable with the basic software based on the basic software information of the terminal device, or a destination to provide the presentation information, so that negative effects such as the presentation information not being able to be browsed at the received terminal device can be prevented from occurring.

The management device preferably acquires the database information from the terminal device, determines appropriateness of change when change is made to the acquired database, and updates the own database when determining that the change is appropriate and notifies a terminal device that made the change that the change is inappropriate when determining that the change is inappropriate.

According to the configuration described above, the management device acquires the database information from the terminal device. Thus, the data of the database managed by each terminal device and the database managed by the management server can be made the same common data, thus allowing an effective use of the data of the database.

Furthermore, when the data of the database of the terminal device is changed, the appropriateness of such change is made, thus ensuring the reliability and the certainty of the common database used in the entire system.

When the management device changes the own database, the management device preferably also provides information related to the change to other terminal devices.

According to the configuration described above, when the management device changes the own database, the information related to such change is also provided to other terminal devices, so that the most recent database can be always shared in the entire system.

Advantageous Effects of Invention

The present invention has an advantage of providing a display information management system capable of greatly reducing the burden of the management device such as a management server when providing presentation screen information created at each terminal, and information of a database associated therewith to other terminals.

BRIEF DESCRIPTION OF THE DRAWINGS

FIG. 2 is a schematic block diagram showing a main configuration of a terminal of FIG. 1.

FIG. 3 is a schematic block diagram showing a main configuration of a terminal side various information storage unit of FIG. 2.

FIG. 4 is a schematic block diagram showing a main configuration of a management server of FIG. 1

FIG. 5 is a schematic block diagram showing a main content of a server side first various information storage unit of FIG. 4.

FIG. 6 is a schematic block diagram showing a main content of a server side second various information storage unit of FIG. 4.

FIG. 7 is a schematic block diagram showing a main configuration of a terminal of FIG. 1.

FIG. 9 is another schematic flowchart showing a main operation example, and the like of the doctor explanatory material management system.

FIG. 13 is a schematic explanatory view showing a main content of terminal side presentation data of FIG. 3.

DESCRIPTION OF THE EMBODIMENTS

Examples

Hereinafter, preferred embodiments of the present invention will be described in detail with reference to the accompanying drawings, and the like.

The embodiments described below are preferred specific examples of the present invention, and thus are given technically preferred various limitations, but the scope of the present invention is not to be limited to such modes unless a description limiting the present invention is particularly made in the following description.

Figure 1:
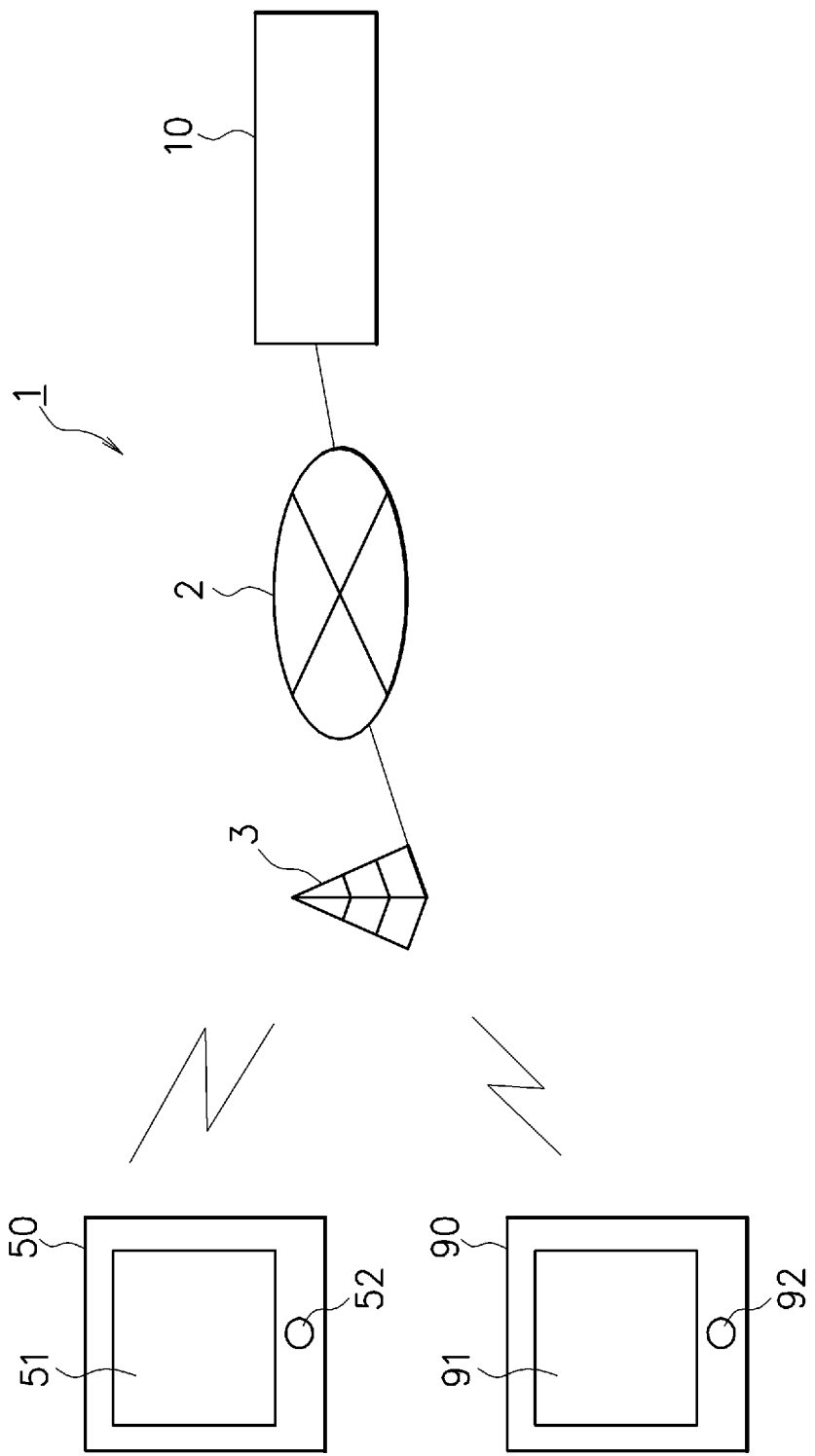
FIG. 1 is a schematic view showing, for example, a doctor explanatory material management system, which is a display information management system, of the present invention.

FIG. 1 is a schematic view showing, for example, a doctor explanatory material management system 1, which is a display information management system of the present invention.

As shown in FIG. 1, the doctor explanatory material management system 1 includes, for example, a management server 10, which is a management device managed by a pharmaceutical firm, and the like.

The management server 10 is communicably connected to, for example, a terminal 50 and a terminal 90, which are terminal devices, by way of an Internet network 2, a base station 3, and the like.

The terminal 50 and the terminal 90 are carried and held by a medical representative (MR), who is an employee and the like of the pharmaceutical firm, and are configured to display medical information of a medication, for example, "antihypertensive drug α" of the pharmaceutical firm on a terminal 50 side touch panel type display 51 and a terminal 90 side touch panel type display 91, which are display units of the terminal 50 and the terminal 90, and provide various types of information while showing such medical information to a health personnel such as a doctor.

Furthermore, as shown in FIG. 1, the terminal 50 and the terminal 90 are so-called tablet type terminals, and the terminal 50 and the terminal 90 include the "touch panel type display 51" and the "touch panel type display 91" having a vertically long rectangular shape at a central part thereof.

The touch panel is an electronic component in which the display unit such as the display and a position input device are combined, and is an input device to which a user can input various types of information by touching the display on the display.

The terminal 50 and the terminal 90 include a terminal side 50 input button 52 and a terminal 90 side input button 92, in addition to the terminal 50 side touch panel type display 51 and the terminal 90 side touch panel type display 91, respectively.

The terminal 50, the terminal 90, and the management server 10 include a computer, as well as a CPU (Central Processing Unit), a RAM (Random Access Memory), a ROM (Read Only Memory), and the like (not shown), which are connected by way of a bus, and the like.

A basic software, for example, Microsoft Windows (registered trademark), OSX (registered trademark), or the like, which is the Operation System (OS), for running an operation including an abstraction of hardware of the computer is mounted on the terminal 50, and the like to operate an application software on the computer.

Furthermore, any software, for example, Microsoft Windows or OSX of the basic software is mounted on each terminal 50, and the like.

In the present embodiment, an example in which the Microsoft Windows is mounted on the terminal 50, and the OSX is mounted on the terminal 90 will be described.

In the present embodiment, specific information displaying software for creating a presentation screen that operates on the OS such as the Power Point (registered trademark), which is a presentation application, is installed in the terminal 50.

Another specific information displaying software that operates on the OS of the terminal 90 such as the PDF/A-1 (15019005-1) is installed in the terminal 90, so that a PDF screen is displayed as the presentation screen on the display 91.

FIG. 2 is a schematic block diagram showing a main configuration of the terminal 50 of FIG. 1. As shown in FIG. 2, the terminal 50 includes a "terminal 50 control unit 53", which terminal 50 control unit 53 controls the "terminal 50 side touch panel type display 51" and the "terminal 50 side input button 52" shown in FIG. 1 and also controls a "terminal 50 side communication device 54" for communication with the management server 10, and the like of FIG. 1.

The terminal 50 side control unit 53 also controls a "terminal 50 side various information storage unit 60" shown in FIG. 2.

FIG. 3 is a schematic block diagram showing a main configuration of the terminal 50 side various information storage unit 60 of FIG. 2. The contents thereof will be described later.

FIG. 4 is a schematic block diagram showing a main configuration of the management server 10 of FIG. 1. As shown in FIG. 4, the management server 10 includes a "server control unit 11", which server control unit 11 is configured to control a "server side communication device 12" for communication with the terminal 50, and the like, a "server side display 13" for displaying various types of information, a "server side input device 14" for inputting various types of information, and the like.

The server control unit 11 also controls a "server side first various information storage unit 20" and a "server side second various information storage unit 30" shown in FIG. 4.

FIGS. 5 and 6 are schematic block diagrams showing a main content of the "server side first various information storage unit 20" and the "server side second various information storage unit 30" of FIG. 4, respectively. The contents thereof will be described later.

FIG. 7 is a schematic block diagram showing a main configuration of the terminal 90 of FIG. 1. As shown in FIG. 7, the terminal 90 includes a "terminal 90 control unit 93", which terminal 90 control unit 93 controls the "terminal 90 side touch panel type display 91" and the "terminal 90 side input button 92" shown in FIG. 1, and also controls a "terminal 90 side communication device 94" for communication with the management server 10, and the like of FIG. 1.

The terminal 90 side control unit 93 also controls a "terminal 90 side OS information storage unit 95", a "terminal 90 side database 96", and a "terminal 90 side various information storage unit 97" shown in FIG. 7.

The contents of the "terminal 90 side OS information storage unit 95", the "terminal 90 side database 96", and the "terminal 90 side various information storage unit 97" will be described later.

FIGS. 8 to 12 are schematic flowcharts showing a main operation example, and the like of the doctor explanatory material management system 1.

In the present embodiment, an example in which the MR (medical representative), who is an employee of a pharmaceutical firm, uniquely prepares a presentation material such as a slide for explaining the information on one's product "antihypertensive drug α" for doctors in the cardiovascular department of a hospital he/she is charge of with his/her terminal 50, registers the prepared material to one's management server 10, and sometime later, another MR of the same firm downloads, and the like the relevant presentation material to his/her terminal 90 will be described below.

Figure 8:
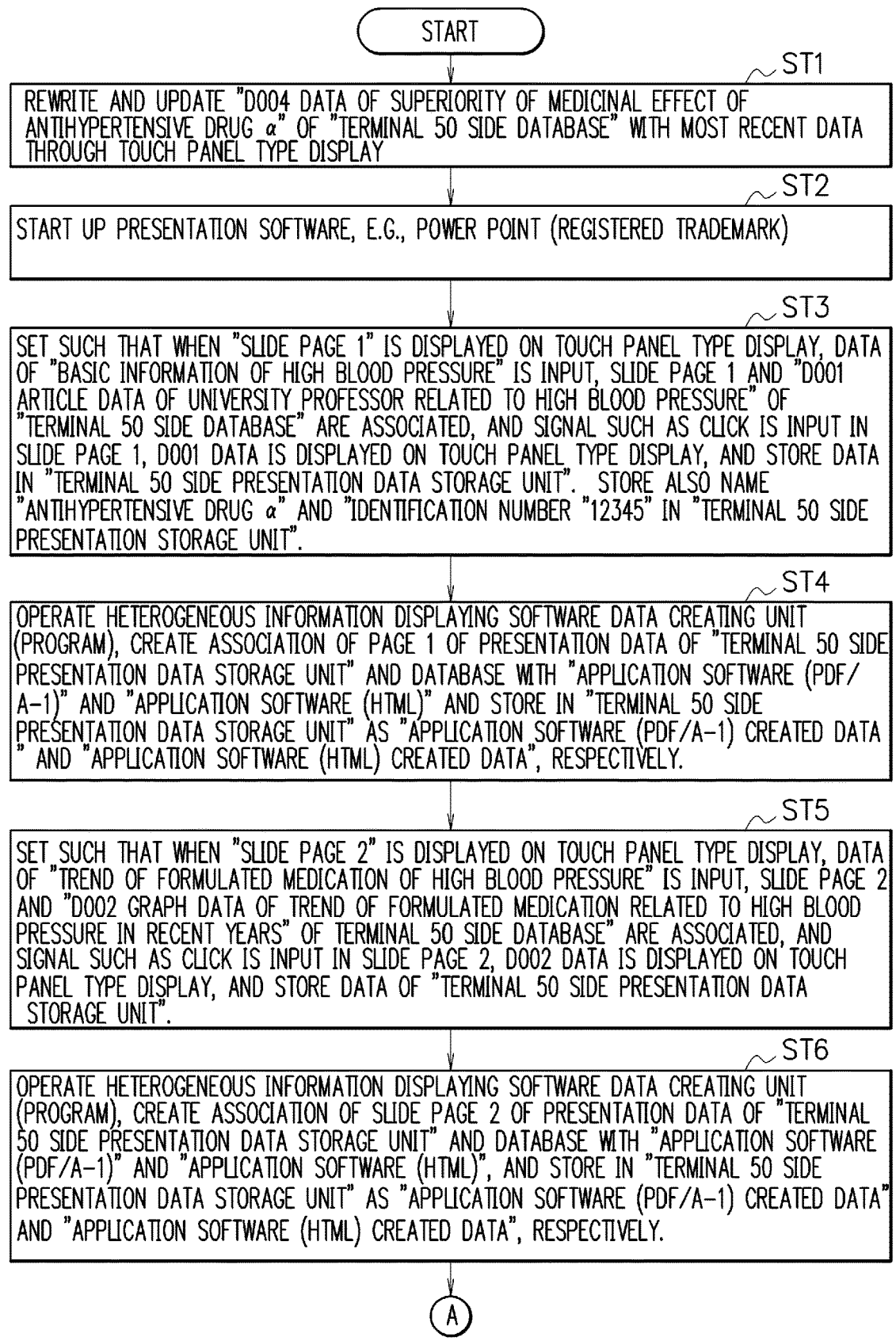
FIG. 8 is a schematic flowchart showing a main operation example, and the like of the doctor explanatory material management system.
Figure 10:
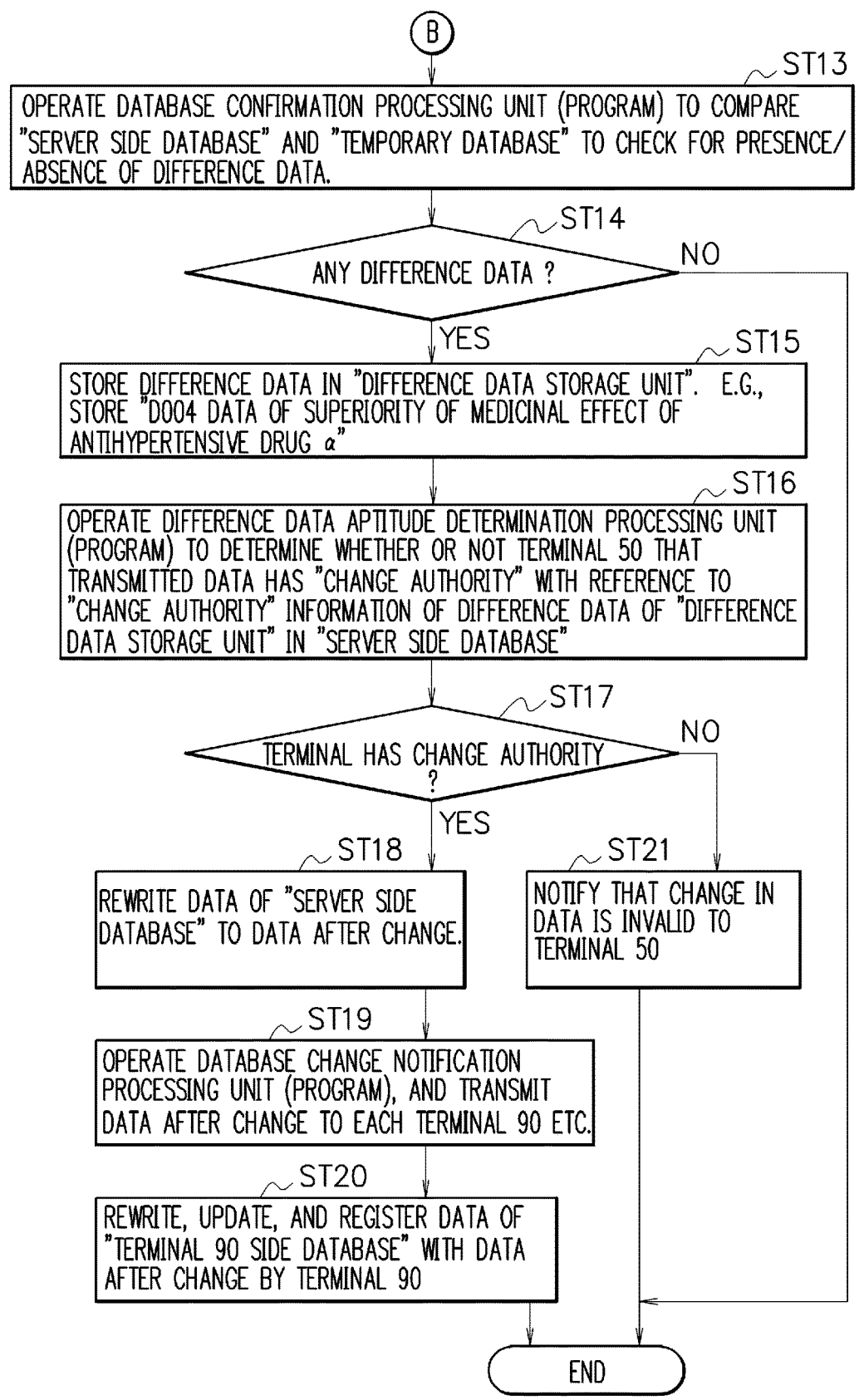
FIG. 10 is another schematic flowchart showing a main operation example, and the like of the doctor explanatory material management system 1.

In step ST (hereinafter referred to as "ST") 1 of FIG. 8, "D004 data of superiority of medicinal effect of antihypertensive drug α" in the "terminal 50 side database 61" shown in FIG. 3 is rewritten and updated with the most recent data through an input means such as the touch panel type display 51.

The MR of the terminal 50 has the authority to rewrite the "D004" data as registered in the "terminal 50 side database 61" of FIG. 3, and the relevant MR also updates the data to use the material of "D004" in the presentation material of the "antihypertensive drug α" to prepare later.

Therefore, in the present system 1, the terminal 50 side database 61, and the like are accommodated in each terminal 50, 90, respectively, and the content of the databases are made the same content including the management server 10 to enhance the convenience of the data.

The process then proceeds to ST2. In ST2, the MR starts up the presentation application (e.g., Power Point) to start the preparation of the presentation material such as the slide for explaining the information of one's product "antihypertensive drug α" to the doctors in the cardiovascular department of the hospital he/she is charge of Specifically, "presentation software (Power Point) (program) 62 of FIG. 3 is driven.

The process then proceeds to ST3. In ST3, setting is made such that when "slide page 1" is displayed on the touch panel type display 51, the data of "basic information of high blood pressure" is input, the slide page 1 and "D001 article data of university professor related to high blood pressure" in the "terminal 50 side database 61" of FIG. 3 are associated, and a signal such as a click is input in the slide page 1, the D001 data is displayed on the touch panel type display 51.

This is then stored in a "terminal 50 side presentation data storage unit 63" of FIG. 3. The stored data is an example of presentation information.

FIG. 13 is a schematic explanatory view showing a main content of the "terminal 50 side presentation data 63a" of FIG. 3.

As shown in FIG. 13, the "basic information of high blood pressure" in the slide page 1 created with the presentation application (Power Point) and the data of "D001" associated therewith are stored in the "terminal 50 side presentation data 63a".

Furthermore, information on the name "antihypertensive drug α" and the identification number "12345" are also stored in the terminal 50 side presentation data 63a.

The process then proceeds to ST4. In ST4, "heterogeneous information displaying software data creating unit (program) 64" shown in FIG. 3 is operated, so that the association of the slide page 1 in the field created with the presentation application (Power Point) of the "terminal 50 side presentation data storage unit 63" shown in FIG. 13 and the terminal 50 side database 61 can also be created with the application software PDF/A-1 and the application software HTML.

The material can also be prepared with different application software for the following reasons.

The OS mounted on the terminal 50 is Microsoft Windows, and the OS mounted on the terminal 90 is OSX.

In such a case, the Power Point operates normally on the Microsoft Windows, but may not operate normally on the OSX.

Furthermore, if the Power Point data is converted to the PDF/A-1 data, and the like, defects may occur in the association with the terminal 50 side database 61 described above during the conversion.

The data created with the Power Point is thus also created with the application software of a different format such as PDF/A-1, HTML, and the like.

Therefore, if the PDF/A-1 operates more normally than the Power Point on a terminal, for example, the terminal 90 mounted with a different OS, the data created with the PDF/A-1 can be provided, as will be described later, so that defects in the display at the terminal 90, and the like can be avoided from occurring Such task is carried out by each terminal 50, and the like that prepares each presentation material rather than by the management server 10, and hence the burden of the management server 10 can be significantly reduced.

In ST4, the data also created with the application software (PDF/A-1) and the application software (HTML) are stored as "application software (PDF/A-1) created data" and the "application software (HTML) created data" of FIG. 13.

The "application software (PDF/A-1) created data" and the "application software (HTML) created data" are examples of heterogeneous presentation information.

The process then proceeds to ST5. In ST5, setting is made such that when "slide page 2" is displayed on the touch panel type display 51, the data of "trend of formulated medication of high blood pressure" is input, the slide page 2 and "D002 graph data of trend of formulated medication related to high blood pressure in recent years" in the "terminal 50 side database 61" are associated, and a signal such as click is input in the slide page 2, the D002 data is displayed on the touch panel type display 51, and the data is stored in the field created with the presentation application (Power Point) of the "terminal 50 side presentation data storage unit 63" of FIG. 13.

The process then proceeds to ST6. In ST6, the heterogeneous information displaying software data creating unit (program) 64 is operated, so that the association of the slide page 2 in the field created with the presentation application (Power Point) of the "terminal 50 side presentation data 63a" of the "terminal 50 side presentation data storage unit 63" and the database is created with the application software (PDF/A-1) and the application software (HTML), and respectively stored in the "terminal 50 side presentation data storage unit 63" as "application software (PDF/A-1) created data" and the "application software (HTML) created data".

The process then proceeds to ST7. In ST7, setting is made such that when "slide page 3" is displayed on the touch panel type display 51, "prescription example of high blood pressure" is input, the slide page 3 and "D003 prescription example data related to high blood pressure" in the "terminal 50 side database 61" of FIG. 3 are associated, and a signal such as click is input in the slide page 3, the D003 data is displayed on the touch panel type display 51, and the data is stored in the field created with the presentation application (Power Point) of the "terminal 50 side presentation data storage unit" of FIG. 13.

The process then proceeds to ST8. In ST8, the heterogeneous information displaying software data creating unit (program) 64 of FIG. 3 is operated, so that the association of the slide page 3 in the field created with the presentation application of the "terminal 50 side presentation data storage unit 63" and the "terminal 50 side database 61" is created with the application software (PDF/A-1) and the application software (HTML), and respectively stored in the "terminal 50 side presentation data storage unit 63" as "application software (PDF/A-1) created data" and the "application software (HTML) created data".

The process then proceeds to ST9. In ST9, setting is made such that when "slide page 4" is displayed on the touch panel type display 51, "superiority of medicinal effect of antihypertensive drug α" is input, the slide page 4 and the "D004 data of superiority of medicinal effect of antihypertensive drug α" of the "terminal 50 side database 63" are associated, and a signal such as click is input in the slide page 4, the D004 data is displayed on the touch panel type display 51, and the data is stored in the field created with the presentation application (Power Point) of the "terminal 50 side presentation data storage unit" of FIG. 13.

The process then proceeds to ST10. In ST10, the heterogeneous information displaying software data creating unit (program) 64 of FIG. 3 is operated, so that the association of the slide page 4 of the presentation application of the "terminal 50 side presentation data storage unit 63" and the "terminal 50 side database 61" is created with the application software (PDF/A-1) and the application software (HTML), and respectively stored in the "terminal 50 side presentation data storage unit 63" as "application software (PDF/A-1) created data" and the "application software (HTML) created data".

The operations of creating the slide pages 1 to 4 of the "antihypertensive drug α" by the terminal 50 and associating the slide pages with the data of the "terminal 50 side database 61" are then terminated.

In the present embodiment, the data are created with the presentation application (Power Point), and at the same time, data of the same content is also created with the "application software (PDF/A-1) and the "application software (HTML)" and stored in the "terminal 50 side presentation data 63a" of FIG. 13.

Therefore, the MR, who is the operator of the terminal 50, completes all the operations in one time without the need to perform the same task three times, and hence the operation of the MR does not become cumbersome and can be rapidly processed.

The process then proceeds to ST11. In ST11, the terminal 50 transmits the data of the "terminal 50 side presentation data storage unit 63" and the "terminal 50 side database 61" to the management server 10.

The process then proceeds to ST12. In ST12, the management server 10 stores the data of the "terminal 50 side presentation data storage unit 63" and the "terminal 50 side database 61" in the "server side presentation data storage unit 21" and a "temporary database storage unit 22" of FIG. 5, respectively.

The process then proceeds to ST13. In ST13, a "database confirmation processing unit (program) 23" of FIG. 5 is operated to compare the "server side database 24" and the "temporary database 22" and check for presence/absence of difference data.

The content of the "server side database 24" is the same content as the "terminal 50 side database 61" of the terminal 50 and the "terminal 90 side database 96" of the terminal 90 of FIG. 7.

If the difference data is present in ST14, the process proceeds to ST15.

In ST15, the difference data is stored in a "difference data storage unit 25" of FIG. 5. In the present embodiment, since the terminal 50 changed the "D004 data of superiority of medicinal effect of antihypertensive drug α" in ST1, the "D004 data of superiority of medicinal effect of antihypertensive drug α" is stored in the "difference data storage unit 25".

The process then proceeds to ST16. In ST16, a "difference data aptitude determination processing unit (program) 26" of FIG. 5 is operated, and with reference to "change authority" information of the difference data of the "difference data storage unit 25" in the "server side database 24" (the data is similar to the "terminal 50 side database 61" of FIG. 3), whether or not the terminal 50 that transmitted the relevant data has "change authority" is determined.

The process then proceeds to ST17. If determined that the terminal has change authority in ST17, the process proceeds to ST18. In the present embodiment, the process proceeds to ST18 as the terminal 50 has the change authority for the "D004 data of superiority of the medicinal effect of the antihypertensive drug α", as shown in the "terminal 50 side database 61" of FIG. 3.

In ST18, the management server 10 rewrites the data of the "server side database 24" to the data after the change.

In other words, the change is made to correspond with the changed "D004 data of superiority of the medicinal effect of the antihypertensive drug α" of the "terminal 50 side database 61".

The unification of the content in the database of the terminal 50 and the management server 10 is thereby realized. Furthermore, the reliability and the certainty of the content of the database can be ensured since the content of the database is changed after confirming the presence/absence of authority.

The process then proceeds to ST19. In ST19, a "database change notification processing unit (program) 31" of the management server 10 of FIG. 6 is operated to transmit the data after the change in the "server side database 24" to each terminal, for example, the terminal 90, and the like of FIG. 1.

The process then proceeds to ST20. In ST20, the terminal 90 rewrites the data of the "terminal 90 side database 96" of FIG. 7 to the data after the change based on the received data, and updates and registers the same.

Thus, it can be ensured that the databases of all the terminals 50, 90, and the like and the management server 10 have the same content, and are the most recent content.

Therefore, commonality, reliability, and the like of the content of the database used when the MR presents various types of information to doctors, and the like can be ensured in each terminal 50, and the like.

If determined that the terminal does not have the change authority in ST17, the process proceeds to ST21, and this is notified to the terminal 50.

The main steps of providing the presentation material prepared with the terminal 50 to the terminal 90 with respect to the management sever 10 will now be described using the flowchart of FIGS. 11 and 12.

Figure 11:
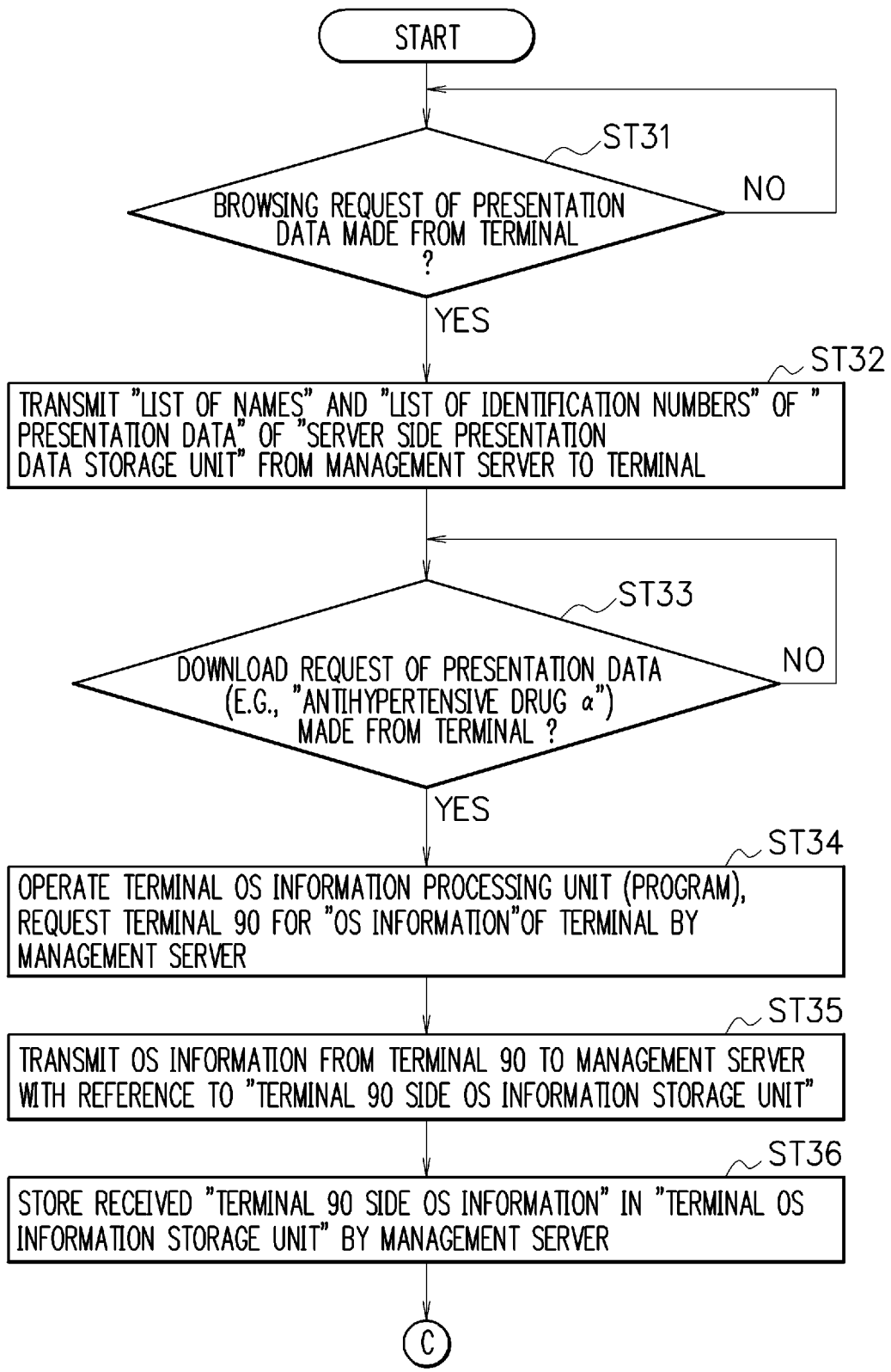
FIG. 11 is another schematic flowchart showing a main operation example, and the like of the doctor explanatory material management system 1.
Figure 12:
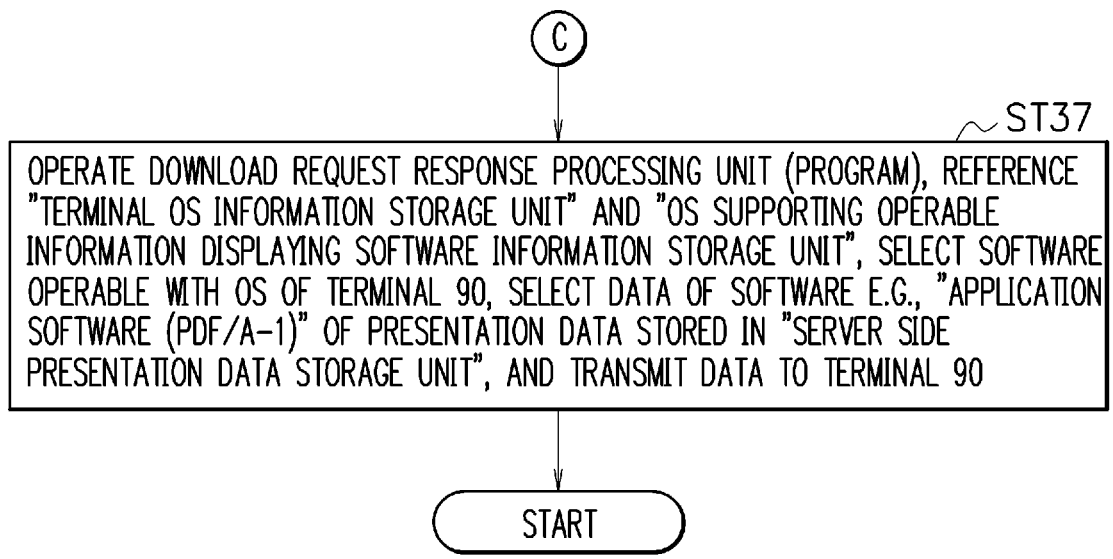
FIG. 12 is another schematic flowchart showing a main operation example, and the like of the doctor explanatory material management system 1.

If the MR holding the terminal 90 of FIG. 1 thinks of using the presentation material of the "antihypertensive drug α" prepared with the terminal 50, the management server 10 first determines whether or not a browsing request of the presentation data is made from the terminal 90 in ST31 of FIG. 11.

Specifically, determination is made by a "browsing request determination processing unit (program) 32" of FIG. 6.

If determined that the browsing request is made in ST31, the process proceeds to ST32. In ST32, the management server 10 transmits a "list of names" and a "list of identification numbers" of the "presentation data" of the "server side presentation data storage unit 21" to the terminal.

The process then proceeds to ST33. In ST33, determination is made on whether or not a download request of the presentation data such as the "antihypertensive drug α" is made from the terminal 90, and for example, if the download request of the presentation data of the "antihypertensive drug α" created by the terminal 50 is made, the process proceeds to ST34.

In ST34, a "terminal OS information processing unit (program) 33" of FIG. 6 of the management server 10 is operated, and the management server 10 requests the terminal 90 for the "OS information", which is the basic software mounted on the terminal 90.

The process then proceeds to ST35. In ST35, the terminal 90 references the "terminal 90 side OS information storage unit 95" of FIG. 7, and transmits the OS information, for example, a notification that the OS is the OSX to the management server 10.

The process then proceeds to ST36. In ST36, the management server 10 stores the received "terminal 90 side OS information", for example, the OSX in a "terminal OS information storage unit 34" of FIG. 6.

The process then proceeds to ST37. In ST37, a "download request response processing unit (program) 35" of FIG. 6 is operated, and the "terminal OS information storage unit 34" and an "OS supporting operable information displaying software information storage unit 36" are referenced.

The "OS supporting operable information displaying software information storage unit 36" stores information for selecting, for example, "presentation application (Power Point)", "application software (PDF/A-1)", "application software (HTML)", or the like operable on the OS (OSX) of the terminal 90, and the like.

Thus, the management server 10 selects the presentation data of the "antihypertensive drug α" including the data of the relevant software, for example, the "application software (PDF/A-1)" of the presentation data (include "terminal 50 side presentation data 63a" of FIG. 13) stored in the "server side presentation data storage unit 21", and transmits the relevant data to the terminal 90.

Therefore, although the OS differs between the terminal 50 and the terminal 90, the presentation of the "antihypertensive drug α" prepared by the terminal 50 can be appropriately displayed on the terminal 90 irrespective of the difference, and can be displayed at a desired timing without causing defects, and the like in the information of the database associated with each slide.

Furthermore, in the present system 1, the management server 10 can greatly reduce the burden of the management server 10, as conversion, and the like of the presentation data from the Power Point to the PDF/A-1, and the like do not need to be carried out.

Moreover, since the data conversion is not carried out, defects, and the like can be prevented from occurring in the association of the slide and the information of the database that occur at the time of data conversion.

The present invention is not limited to the embodiment described above.

EXPLANATION OF REFERENCE NUMERALS 1 doctor explanatory material management system
2 Internet network
3 base station
10 management server
11 server control unit
12 server side communication device
13 server side display
14 server side input device
20 server side first various information storage unit
21 server side presentation data storage unit
22 temporary database storage unit
23 database confirmation processing unit (program)
24 server side database
25 difference data storage unit
26 difference data aptitude determination processing unit (program)
30 server side second various information storage unit
31 database change notification processing unit (program)
32 browsing request determination processing unit (program)
33 terminal OS information processing unit (program)
34 terminal OS information storage unit
35 download request response processing unit (program)
36 OS supporting operable information displaying software information storage unit
50, 90 terminal
53 terminal 50 control unit
54 terminal 50 side communication device
51 terminal 50 side touch panel type display
52 terminal 50 side input button
60 terminal 50 side various information storage unit
61 terminal 50 side database
62 presentation software (Power Point) (program)
63 terminal 50 side presentation data storage unit
63a terminal 50 side presentation data
64 heterogeneous information displaying software data creating unit (program)
91 terminal 90 side touch panel type display
92 terminal 90 side input button
93 terminal 90 control unit
94 terminal 90 side communication device
95 terminal 90 side OS information storage unit
96 terminal 90 side database
97 terminal 90 side various information storage unit

The invention claimed is:

1. A display data management system, comprising:
a first terminal including
  first specific basic software being included in Operation System for running an operation including an abstraction of hardware of a computer to operate application software on the computer,
  first specific data displaying software being software for displaying specific data that is for creating presentation screens operable with the first specific basic software, and
  a database that stores various types of data used with the creation of the presentation screens;
a second terminal including second specific data displaying software operable with second specific basic software different from the first specific basic software; and
a management device that is communicably connected to the first and second terminals; wherein
the first terminal
  rewrites and updates only a content of the database of the first terminal with the most recent data by communicating with the management device in order to make the content of the database the same content of the management device wherein the first terminal has an authority to rewrite the content of the database,
  associates data of the database and the presentation screens when the first specific data displaying software creates a presentation screens,
  creates the presentation data in a specific page unit using the first specific data displaying software in association with the database,
  after that, for the specific page unit, creates heterogeneous presentation data in the page unit being data created with the second specific data displaying software in association with the database,
  repeat the above processes in the page order up to the final page, wherein contents of the presentation data and the heterogeneous presentation data are the same, and
  transmits the presentation data and the heterogeneous presentation data to the management device, and
the management device selects and provides the heterogeneous presentation data operable with the second specific basic software data of the second terminal being a destination to provide the heterogeneous presentation data.

2. The display data management system according to claim 1, wherein
when the management device changes the database, the management device also provides data related to the change to the second terminal.

* * * * *